United States Patent [19]

Gardner

[11] Patent Number: 5,519,900
[45] Date of Patent: May 28, 1996

[54] PORTABLE HUMIDIFIER APPARATUS

[76] Inventor: G. Byron Gardner, 98 Wadsworth, Ste. 127-195, Lakewood, Colo. 80226

[21] Appl. No.: 415,706

[22] Filed: Apr. 3, 1995

[51] Int. Cl.$^6$ ................................................. E03D 1/00
[52] U.S. Cl. ........................... 4/353.000; 4/420.200; 4/448; 4/537
[58] Field of Search ..................... 4/353, 420.2, 420.4, 4/448, 535, 537, 661

[56] References Cited

U.S. PATENT DOCUMENTS

| | | | |
|---|---|---|---|
| 3,090,965 | 5/1963 | Panza | 4/661 X |
| 3,281,864 | 11/1966 | Linnehan | 4/537 |
| 3,314,080 | 4/1967 | Shilling, Jr. | 4/353 |
| 3,749,092 | 7/1973 | Williams | 4/537 X |
| 3,879,768 | 4/1975 | Murphy | 4/353 |
| 4,451,942 | 6/1984 | Hirano et al. | 4/448 X |
| 5,295,274 | 3/1994 | Daniels et al. | 4/448 X |

FOREIGN PATENT DOCUMENTS

| | | | |
|---|---|---|---|
| 5017988 | 1/1993 | Japan | 4/353 |
| 6158700 | 6/1994 | Japan | 4/353 |

*Primary Examiner*—Robert M. Fetsuga

[57] ABSTRACT

A portable humidifier apparatus is used with a water closet tank which contains a quantity of water therein and includes a base assembly and an electrically powered and controlled water pump assembly, attached to the base assembly, which draws water from the quantity of water contained within the water closet tank through a filter connected to the distal end of the cold water intake tube. An electrically powered and controlled vaporizer assembly receives water and air and produces a quantity of vapor. A humidity chamber is connected to the vaporizer assembly for receiving vapor from the vaporizer assembly. The humidity chamber includes an exit aperture. An electrically powered and controlled fan assembly is connected to the vaporizer chamber such that a blend of air and vapor is mixed in the humidity chamber and emerges from the humidity chamber through the exit aperture. An electrically powered and controlled water heater assembly is in-line between the cold water outlet assembly and the vaporizer assembly. An electrically powered and controlled air heater assembly is in-line between the fan and the vaporizer assembly. A face mask assembly includes a bottom portion adapted to be received by an outside adaptor portion of the humidity chamber. A personal hygiene assembly is also connected to the water heater assembly and includes a flexible tubing assembly with a nozzle connector at both ends. A selector valve assembly is connected in-line between the flexible tubing assembly and the water heater assembly. A heated-air-carrying conduit is connected to the selector valve assembly, and an electrically powered and controlled air heater assembly is connected between the fan assembly and the selector valve assembly.

28 Claims, 5 Drawing Sheets

PORTABLE HUMIDIFIER APPARATUS

BACKGROUND OF THE INVENTION

1. Field of the Invention

The present invention relates generally to humidifier devices and, more particularly, to humidifier devices that are substantially portable and self-contained.

2. Description of the Prior Art

Humidifier devices are of two basic types. There are humidifier devices designed to be permanently fixed to the central heating systems of buildings, and there are humidifier devices that are substantially portable and can be moved within a building from one location to another. A humidifier device that is permanently fixed to a central heating system is permanently connected to source of water and a drain to supply the humidity. However, a portable humidifier must somehow be supplied with water at each location that the portable device is placed. Some portable humidifier devices contain a reservoir that must be filled periodically as the water is used up. To avoid the necessity of manually filling a water reservoir, it would be desirable if a humidifier apparatus were connected to an automatically refillable water supply.

To avoid the need to mechanically connect the portable humidifier apparatus to a pressurized water supply and drainage system, a number of innovations have been developed, and the following U.S. Patents are representative of some of those innovations: U.S. Pat. Nos. 3,314,080 and 3,879,768. More specifically, both U.S. Pat. Nos. 3,314,080 and 3,879,768 disclose humidifying systems which rest upon the tank of a water closet and draw water directly from the reservoirs of water in the tanks. Even more specifically, U.S. Pat. No. 3,314,080 employs a porous, water-wettable mat for evaporation of water to provide the humidity. A relatively large mat having a relatively large surface area is required for the mat to dispense an adequate amount of humidity. However, it may not be desirable to take up such a relatively large space with a mat. For example, accommodation of the relatively large mat requires a relatively high profile apparatus placed on top of a water closet tank. In this respect, it would be desirable if a humidifier apparatus provided an adequate supply of humidity without using a relatively large mat. Furthermore, space above a water closet tank may be relatively: small and could not accommodate such a high profile apparatus. In this respect, it would be deskable if a humidifier apparatus were provided that fit on top of a water closet tank with a low profile.

U.S. Pat. No. 3,879,768 discloses an apparatus for humidifying and purifying air which employs a very high profile humidifying device. Moreover, to use this device, a lid of the water closet must be removed. To preserve cleanliness of the water in the water closet tank and to reduce noises emitted from water closet tank when the toilet is flushed, it would be desirable if a humidifier apparatus were provided that retained use of a cover for the water closet tank.

Still other features would be desirable in a portable humidifier apparatus. For example, a person may want to treat oneself with a facial treatment employing relatively high humidity. In this respect, it would be desirable if a humidifier apparatus that is mounted on a water closet tank were equipped with a device for providing a high humidity facial treatment. Furthermore, for humidity that is applied to a person's face, it would be desirable if there was a provision for heating the vapors. Also, it would be desirable for the temperature of the vapors to be controlled. In addition, it may be desirable to dispense scented oils into the humidity that is dispensed.

In some bathrooms, permanent plumbing fixtures are provided for carrying out douche and enema activities. However, most bathrooms are not equipped with such fixtures. In this respect, it would be desirable if a water closet tank could be converted as a water supply for douche or enema implements that would be stored, when not in use, in the lid for a water closet tank. Furthermore, after employing a douche or enema, it would be desirable if a stream of warm dry air would be available for drying off body parts that are wet.

Often, electrical boxes on walls of bathrooms have two outlets. For a portable humidifier apparatus that derives electrical power from such an electrical box, it would be desirable if the portable humidifier apparatus did not use such an electrical box in a manner to reduce the available outlets to only one outlet.

Thus, while the foregoing body of prior art indicates it to be well known to use a water closet tank as a source of water for a humidifier apparatus, the prior art described above does not teach or suggest a portable humidifier apparatus which has the following combination of desirable features: (1) connects to an automatically refillable water supply; (2) provides an adequate supply of humidity without using a relatively large mat; (3) fits on top of a water closet tank with a low profile; (4) retains use of a cover for the water closet tank; (5) provides a humidifier apparatus that is mounted on a water closet tank and that is equipped for providing a high humidity facial treatment; (6) provision for heating the vapors used for a facial treatment; (7) controls the temperature of the vapors; (8) dispenses scented oils into the humidity that is dispensed; (9) provides for using a water closet tank as a water supply for douche or enema implements that would be stored, when not in use, in the lid for the water closet tank; (10) does not use a two-outlet electrical box in a manner to reduce the available outlets to only one outlet; and (11) provides a stream of warm dry air for drying off body parts that are wet. The foregoing desired characteristics are provided by the unique portable humidifier apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a portable humidifier apparatus which is used with a water closet tank which contains a quantity of water therein and includes a base assembly and an electrically powered and controlled water pump assembly attached to the base assembly. A cold water intake tube with a water filter on its distal end is connected to the water pump assembly. The cold water intake tube extends downward from the water pump assembly into the quantity of water contained within the water closet tank. A cold water outlet assembly is connected to the water pump assembly. An electrically powered and controlled vaporizer assembly is attached to the base assembly via a humidifier chamber. The vaporizer assembly produces a quantity of vapor. A cold/hot water outlet assembly is connected to the humidity chamber. The humidity chamber, attached to the base assembly, is connected to the vaporizer assembly for receiving vapor from the vaporizer assembly.

The humidity chamber includes an exit aperture. An electrically powered and controlled forced air assembly is attached to the base assembly and is connected to the vaporizer assembly. The forced air assembly includes an air intake conduit, an electrically powered fan assembly connected to the air intake conduit, an air heater assembly, and an air output conduit connected to the fan assembly. The air output conduit is connected to the vaporizer assembly, such that a blend of output air from the fan assembly and water in the base of the humidity chamber assembly is mixed by the vaporizer assembly to create a mist which emerges from the humidity chamber through the exit aperture.

An electrically powered and controlled water heater assembly, attached to the base assembly, is in-line between the cold water outlet assembly and the humidity chamber. The water heater assembly is connected to the cold water outlet assembly, and a heated water outlet assembly is connected to the water heater assembly. The heated water outlet assembly is connected to the humidity chamber.

The base assembly has a base length greater than a length of the water closet tank and has a base width greater than a width of the water closet tank, such that the base assembly is adapted to fit over the water closet tank and serve as a lid for the water closet tank. A cap assembly, which includes a scent oil dispenser apparatus, is supported by the base assembly and covers the exit aperture of the humidity chamber to direct the flow of mist exiting the humidity chamber.

The heated water outlet assembly includes a selector valve assembly connected to the water heater assembly. A first heated water conduit is connected between the selector valve assembly and the humidity chamber assembly. A replaceable air filter assembly is connected to the air intake conduit of the forced air assembly. The base assembly includes a well region for receiving a plurality of containers which contain a quantity of scented oil.

The humidity chamber cap includes an oil dispenser assembly. The oil dispenser assembly is supported by the humidity chamber. More specifically, the oil dispenser assembly is supported by the outside adaptor portion of the humidity chamber. The oil dispenser assembly includes a bottle-mouth-reception portion. A bottle which includes a mouth portion adapted to be received in the bottle-mouth-reception portion. A flexible tube is connected to the bottle-mouth-reception portion. A flow control assembly is connected to the flexible tube, and an oil receptacle supported by the flow control assembly. The flow control assembly includes a roller, and a roller guide which receives the roller. The roller guide is supported by the flexible tube when the flexible tube is clamped between the roller and the roller guide.

The vaporizer assembly is comprised of an electrically powered and controlled sonic vaporizer unit. The water pump assembly, the water heater assembly, the fan assembly, the air heater assembly, the switch assemblies, and the vaporizer assembly are all powered by a common electrical source. The common electrical source includes an electrical adaptor assembly which includes a pair of male prongs for connecting to a wall outlet and a pair of female sockets adapted to receive a male plug.

The humidity chamber includes an outside adaptor portion. A face mask assembly includes a bottom portion adapted to be received by the outside adaptor portion of the humidity chamber. The outside adaptor portion of the humidity chamber is round, and the bottom portion of the face mask assembly is round and adapted to rotate around the outside adaptor portion of the humidity chamber.

A personal hygiene assembly, attached to the base assembly, is connected to the second heated water conduit of the heated water outlet assembly. The personal hygiene assembly includes a flexible tubing assembly connected to the second heated water conduit. The flexible tubing has connectors at both ends and can easily be replaced. A manual control valve is connected to the flexible tubing assembly for controlling water flow through the flexible tubing assembly. A nozzle fixing assembly is connected to the flexible tubing assembly. A nozzle is connected to the nozzle fixing assembly, and a coiling guide, attached to the base assembly, receives tubing of the flexible tubing assembly that is wound on the coiling guide.

The personal hygiene assembly includes a first nozzle retention assembly attached to the base assembly. A first nozzle is attached to the first nozzle retention assembly. A second nozzle retention assembly is attached to the base assembly, and a second nozzle is attached to the second nozzle retention assembly.

The personal hygiene assembly includes a hinge assembly attached to the base assembly, and a lid assembly is hingedly attached to the base assembly by the hinge assembly.

The personal hygiene assembly includes a selector valve assembly connected in-line between the flexible tubing assembly and the second heated water conduit of the heated water outlet assembly. A heated-air-carrying conduit is connected to the selector valve assembly, and an electrically powered and controlled air heater assembly is connected to the heated-air-carrying conduit. A water filter assembly is connected to a distal end of the water intake tube.

With another embodiment of the invention, the base assembly includes a plurality of feet. The base assembly has a base length less than a length of the water closet lid and has a base width less than a width of the water closet lid, such that the base assembly is adapted to fit onto the water closet lid.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention. It is desired that the scope of the present invention include a construction whereby the vaporizer assembly is removed and replaced by a heating element mounted inside the vapor chamber. This would change the invention to a steam instead of a mist humidifier.

It is therefore an object of the present invention to provide a new and improved portable humidifier apparatus which has all of the advantages of the prior art and none of the disadvantages.

It is another object of the present invention to provide a new and improved portable humidifier apparatus which may be easily and efficiently manufactured and marketed.

It is a further object of the present invention to provide a new and improved portable humidifier apparatus which is of durable and reliable construction.

An even further object of the present invention is to provide a new and improved portable humidifier apparatus which is susceptible of a low cost of manufacture with regard to both materials and labor, and which accordingly is then susceptible of low prices of sale to the consuming public, thereby making such portable humidifier apparatus available to the buying public.

Still yet a further object of the present invention is to provide a new and improved portable humidifier apparatus which connects to an automatically refillable water supply.

Still another object of the present invention is to provide a new and improved portable humidifier apparatus that provides an adequate supply of humidity without using a relatively large mat.

Yet another object of the present invention is to provide a new and improved portable humidifier apparatus which fits on top of a water closet tank with a low profile.

Even another object of the present invention is to provide a new and improved portable humidifier apparatus that retains use of a cover for the water closet tank.

Still a further object of the present invention is to provide a new and improved portable humidifier apparatus which provides a humidifier apparatus that is mounted on a water closet tank and that is equipped for providing a high humidity facial treatment.

Yet another object of the present invention is to provide a new and improved portable humidifier apparatus that provision for heating the vapors used for a facial treatment.

Still another object of the present invention is to provide a new and improved portable humidifier apparatus which controls the temperature of the vapors.

Still another object of the present invention is to provide a new and improved portable humidifier apparatus which provides a timer for controlling whether heated vapors and air are turned on or off.

Yet another object of the present invention is to provide a new and improved portable humidifier apparatus that dispenses scented oils into the humidity that is dispensed.

Still a further object of the present invention is to provide a new and improved portable humidifier apparatus that provides for using a water closet tank as a water supply for douche or enema implements that would be stored, when not in use, in the lid for the water closet tank.

Yet another object of the present invention is to provide a new and improved portable humidifier apparatus which does not use a two-outlet electrical box in a manner to reduce the available outlets to only one outlet.

Still a further object of the present invention is to provide a new and improved portable humidifier apparatus that provides a stream of warm dry air for drying off body parts that are wet.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved portable humidifier apparatus embodying the principles and concepts of the present invention will be described.

Turning to FIGS. 1–6, there is shown a first embodiment of the portable humidifier apparatus of the invention generally designated by reference numeral 10. In its preferred form, portable humidifier apparatus 10 is used with a water closet tank 16 which contains a quantity of water 24 therein and includes a base assembly 12 and an electrically powered and controlled water pump assembly 20 attached to the base assembly 12. A cold water intake tube 22 is connected to the water pump assembly 20. The cold water intake tube 22 extends downward from the water pump assembly 20 into the quantity of water 24 contained within the water closet tank 16. A cold water outlet assembly 28 is connected to the water pump assembly 20. An electrically powered and controlled vaporizer assembly 34 is attached to the base of humidity chamber 36. The vaporizer assembly 34 produces a quantity of vapor. A humidity chamber 36, attached to the base assembly 12, is connected to the vaporizer assembly 34 for receiving vapor from the vaporizer assembly 34. The humidity chamber 36 includes an exit aperture 44. An electrically powered and controlled forced air assembly is attached to the base assembly 12 and is connected to the vaporizer assembly 34. The forced air assembly includes an air intake conduit 38, an electrically powered fan or air blower assembly 40 connected to the air intake conduit 38, an electrically powered air heating assembly 45 connected to the fan assembly 40, and an air output conduit 42 connected to the fan assembly 40. The air output conduit 42 is connected to the vaporizer assembly 34 such that a blend of output air from the fan assembly 40 and vapor from the vaporizer assembly 34 generate mist in the humidity chamber 36, and the mist emerges from the humidity chamber 36 through the exit aperture 44.

An electrically powered and controlled water heater assembly 30, attached to the base assembly 12, is in-line between the cold water outlet assembly 28 and the humidity chamber 36. The water heater assembly 30 is connected to the cold water outlet assembly 28, and a heated water outlet assembly 32 is connected to the water heater assembly 30. The heated water conduit 56 is connected to the humidity chamber 36. A manually operated on/off switch may be employed for turning the water heater assembly 30 on and off. Also, a manually operated on/off switch may be employed for turning the hot air assembly on and off.

Hot air and hot water are used for the mist facial. With the addition of a clock including timer assembly 55, the hot mist can warm up a person's bathroom in the morning before a person wakes up. After a set time, the hot mist will cease. An on/off switch 81 and variable resistance 48 control the hot air and hot water flow and temperature for hot mist facials or just hot mist going into a room. The timer assembly 55 has an on/off switch which is connected to on/off switch 81 to activate the timer assembly 55 and the hot air and water systems that accompany it. The mist will operate at the preset temperature that is set by the variable resistance control 48.

An overflow drain 59 in the humidity chamber 36 is provided to permit excess water to drain back into the water closet to return overflow water in the body of water 24. A noise reduction tube will go around the overflow drain 59. Hot mist will require that hot water circulate in the humidity chamber 36 to maintain a high temperature.

A water level sensor assembly and an on/off water flow switch 47 are connected to the inside of the humidity chamber 36. On/off water flow switch 47 controls water pump 20 except when circulating hot water for hot mist.

In the embodiment of the invention shown in FIGS. 1–6, the base assembly 12 has a base length 14 greater than a length of the water closet tank 16 and has a base width 18 greater than a width of the water closet tank 16, such that the base assembly 12 is adapted to fit over the water closet tank 16 and serve as a lid for the water closet tank 16. On the side of the base assembly 12, next to the personal hygiene lid assembly 78, is a hook 61 for temporary placement of hose 60.

A variable resistance control 46 is in a control circuit used for controlling the mist level for contributing to controlling the percentage of humidity of the air in the room outside the humidity chamber 36. The variable resistance control 48 is in a control circuit used for controlling the temperature of water from the water heater assembly 30 and the air from fan assembly 40. A variable resistance control 50 is in a control circuit used for controlling the preset level of humidity that will activate a humidity level sensor assembly 52. More specifically, the humidity level sensor assembly 52 has its actuation and de-actuation level of humidity controlled by the humistat control assembly 50 and is electrically connected in the control circuits for the vaporizer assembly 34, a two-phase fan control 53, the fan assembly 40, and the water pump 20. The humistat control assembly 50 and the humidity level sensor assembly 52 are calibrated for a range of user determined humidity levels. When the humistat control assembly 50 is set at a selected humidity level, the humidity level sensor assembly 52 serves to maintain the preset humidity level at the selected humidity. If the humidity in the room falls below the set level, the humidity level sensor assembly 52 turns on the vaporizer assembly 34, the fan assembly 40, and the water pump assembly 20 to provide humidified air to the room. If the humidity in the room rises above the set level, the humidity level sensor assembly 52 turns off the vaporizer assembly 34 and the fan assembly 40 and the water pump assembly 20 to discontinue the addition of humidified air to the room. Off-low-high switch assembly 63 is for the fan assembly. On/off switch 81 is for switching hot mist on and off. Indicator lamp 67 is a night light that goes on automatically in the dark. Cap assembly 41, supported by the base assembly 12, covers the exit aperture 44 of the humidity chamber 36 to direct flow of vapor exiting the humidity chamber 36.

The heated water outlet assembly 32 includes a selector valve assembly 54 connected to the water heater assembly 30. A first heated water conduit 56 is connected between the selector valve assembly 54 and the humidity chamber 36. A replaceable air filter assembly 21 is connected to the air intake conduit 38 of the forced air assembly. An electrically powered air heating assembly 45 is connected to the fan of the fan assembly 40. The base assembly 12 includes a well region 27 for receiving a plurality of containers 29 which contain a quantity of scented oil.

Figure 9:
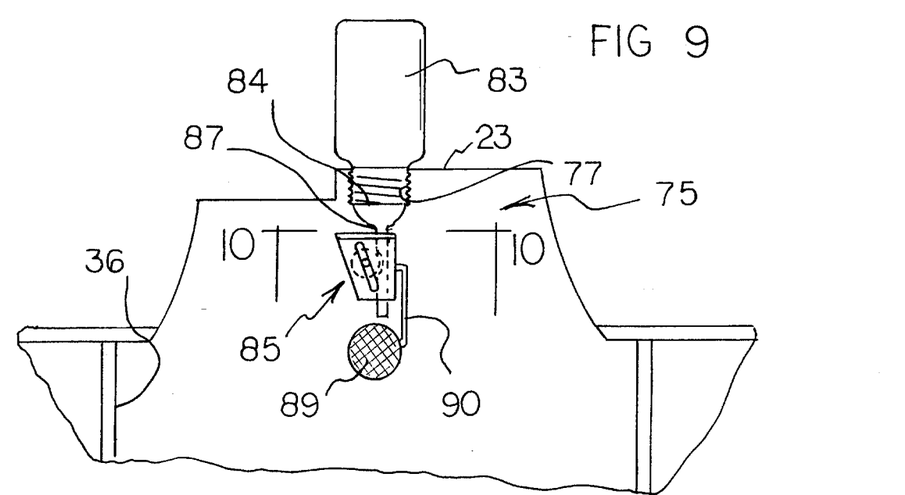
FIG. 9 is a side cross-sectional view of the oil dispenser assembly in position on the outside adaptor portion of the humidity chamber 36.
Figures 10, 11:
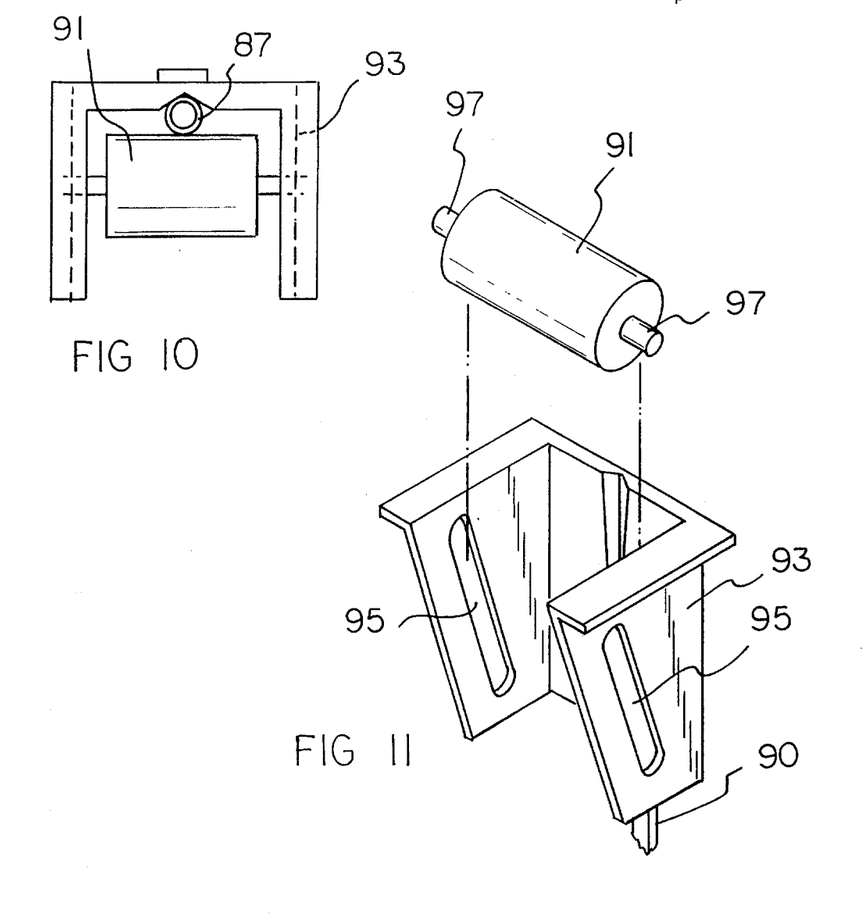
FIG. 10 is an enlarged top view, taken along line 10—10 in FIG. 9, of the roller and the roller guide of the flow control assembly shown in FIG. 9.
FIG. 11 is an exploded perspective view of the roller and the roller guide of the flow control assembly shown in FIG. 10.

As shown in greatest detail in FIGS. 9–11, an oil dispenser assembly 75 is supported by the humidity chamber 36. More specifically, the oil dispenser assembly 75 is supported by the outside adaptor portion 23 of the humidity chamber 36. The oil dispenser assembly 75 may be clipped onto the humidity chamber lid 41. The oil dispenser assembly 75 includes a bottle-mouth-reception portion 77. A bottle 83 which includes a mouth portion 84 adapted to be received in the bottle-mouth-reception portion 77. A flexible tube 87 is connected to the bottle-mouth-reception portion 77. A flow control assembly 85 is connected to the flexible tube 87, and an oil receptacle 89 is supported by the flow control assembly 85 by arm 90. The flow control assembly 85 includes a roller 91, and a roller guide 93 which receives the roller 91. The roller guide 93 is supported by the flexible tube 87 when the flexible tube 87 is clamped between the roller 91 and the roller guide 93. The roller guide 93 has slots 95 which receive axle portion 97 of the roller 91.

More generally, the flow control assembly 85 can be comprised of the same components and materials that are used to make a drip control mechanism for an intravenous (IV) administration unit.

In operating the oil dispenser assembly 75, a bottle 83 which contains a quantity of scented oil has its screw cap removed. The bottle-mouth-reception portion 77 is placed over the mouth portion 84 of the bottle 83, and the mouth portion 84 of the bottle 83 is screwed or snapped into the bottle-mouth-reception portion 77. With the bottle-mouth-reception portion 77 attached to the bottle 83, the bottle 83 is inverted. Flow of scented oil out of the bottle 83 is controlled by adjusting the roller 91 with respect to the roller guide 93. The flexible tube 87 is pinched between the roller 91 and the roller guide 93. How of scented oil through the flexible tube 87 to the interior of the humidity chamber 36 is controlled by the degree of pinching between the roller 91 and the roller guide 93. When the scented oil passes by the roller 91 and the roller guide 93, the scented oil passes out the end of the flexible tube 87 and drops on the receptacle 89 which may be a screen or fabric. The flexible tube 87 can have graduated markings different positions of the roller 91 on the roller guide 93 for different rates of flow of scented oil therethrough.

Turning back to FIGS. 1–6, the vaporizer assembly 34 is comprised of an electrically powered and controlled sonic vaporizer unit. The water pump assembly 20, the water heater assembly 30, the fan assembly 40, and the vaporizer assembly 34 are powered by a common electrical source. The common electrical source includes an electrical adaptor assembly 33 which includes a pair of male prongs 35 for connecting to a wall outlet 37 and a pair of female sockets 39 adapted to receive a male plug.

The humidity chamber 36 includes an outside adaptor portion 23. A face mask assembly 25 includes a bottom portion adapted to be received by the outside adaptor portion 23 of the humidity chamber 36. The outside adaptor portion 23 of the humidity chamber 36 is round, and the bottom portion of the face mask assembly 25 is round and adapted to rotate around the outside adaptor portion 23 of the humidity chamber 36. The face mask assembly 25 is to be used with hot mist for facials.

A personal hygiene assembly, attached to the base assembly 12, is connected to the second heated water conduit 58 of the heated water outlet assembly 32. The personal hygiene assembly includes a flexible tubing assembly 60 connected to the second heated water conduit 58 by means of the connector 80 which is located at an end of the flexible tubing assembly 60. A manual control valve 62 is connected to the flexible tubing assembly 60 for controlling water flow through the flexible tubing assembly 60. A nozzle fixing assembly 64 is connected to the flexible tubing assembly 60. A nozzle 66 is connected to the nozzle fixing assembly 64, and a coiling guide 68, attached to the base assembly 12, receives tubing of the flexible tubing assembly 60 that is wound on the coiling guide 68.

The personal hygiene assembly includes a first nozzle retention assembly 70 attached to the base assembly 12. A first nozzle 66 is attached to the first nozzle retention assembly 70. A second nozzle retention assembly 72 is attached to the base assembly 12, and a second nozzle 74 is attached to the second nozzle retention assembly 72.

The personal hygiene assembly includes a hinge assembly 76 attached to the base assembly 12, and a lid assembly 78 is hingedly attached to the base assembly 12 by the hinge assembly 76. The lid assembly 78 includes an elevated portion 79 which facilitates a person placing a finger tip under the elevated portion 79 for lifting the lid assembly 78.

The personal hygiene assembly includes a selector valve assembly 54 connected in-line between the second heated water conduit 58 of the heated water outlet assembly 32 and the water heater assembly 30. A heated-air-carrying conduit from the fan assembly 40 is connected to the heated water valve assembly 54, and an electrically powered and controlled air heater assembly 45 is connected to the heated-air and water carrying conduit 58. A water filter assembly 26 is connected to a distal end of the water intake tube 22.

In operating the embodiment of the invention shown in FIGS. 1–6, the base assembly 12 is in the form of a lid for the water closet tank 16. A predetermined humidity level is selected by using the variable resistance control 50. When the preset humidity level, as set by the variable resistance control 50, is higher than the humidity in the room as sensed by the humidity level sensor assembly 52, then the electronic circuitry which interconnects the variable resistance control 50, the humidity level sensor assembly 52, the vaporizer assembly 34, the fan assembly 40, and the water pump assembly 20 are actuated causing the various components to generate mist in the humidity chamber 36 for exit from the exit aperture 44 to the room. In contrast, when the preset humidity level, as set by the variable resistance control 50, is less than the humidity in the room as sensed by the humidity level sensor assembly 52, then the electronic circuitry which interconnects the variable resistance control 50, the humidity level sensor assembly 52, the vaporizer assembly 34, the fan assembly 40, and the water pump assembly 20 causes the de-actuation of the various components to stop humidified air from exiting the exit aperture 44 to the room.

To draw water 24 from the water closet tank 16, the end of the cold water intake tube 22, which contains the water filter assembly 26, is immersed in the water 24. The water pump assembly 20 draws water up from the water 24 in the water closet tank 16. The water 24 is pumped to the water heater assembly 30 which is controlled by the variable resistance control 48. Preferably, the maximum temperature of the heated water is 108 degrees Fahrenheit. The heated water flows through the heated water valve assembly 54 and through the first heated water conduit 56 to humidity chamber 36 or through the second heated water conduit 58 to the flexible tubing assembly 60. A pleasant tone can sound when the desired temperature is reached.

The fan assembly 40 includes the electrically powered air heating assembly 45. The fan assembly 40 draws room air through the replaceable air filter assembly 21 and through the air output conduit 42 to the humidity chamber 36. A mixture of the vaporized water and the air blown by the fan assembly 40 is expelled from the exit aperture 44 of the humidity chamber 36. Hot air is used with hot water to obtain a hot mist.

Figure 5:
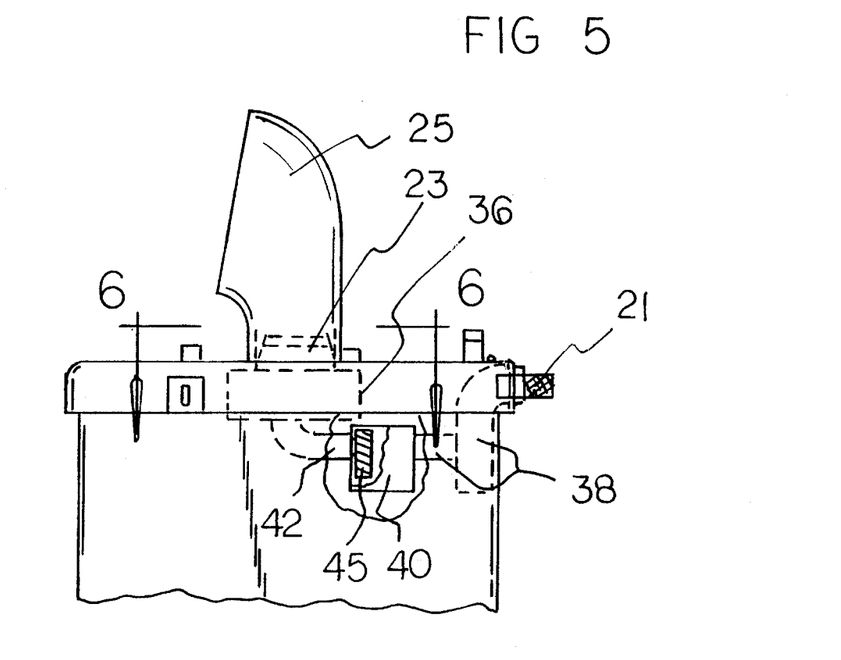
FIG. 5 is a partial side view of the embodiment of the invention shown in FIG. 1 with the lid for personal hygiene compartment down and a face mask for application of humidity to a face in place.
Figure 6:
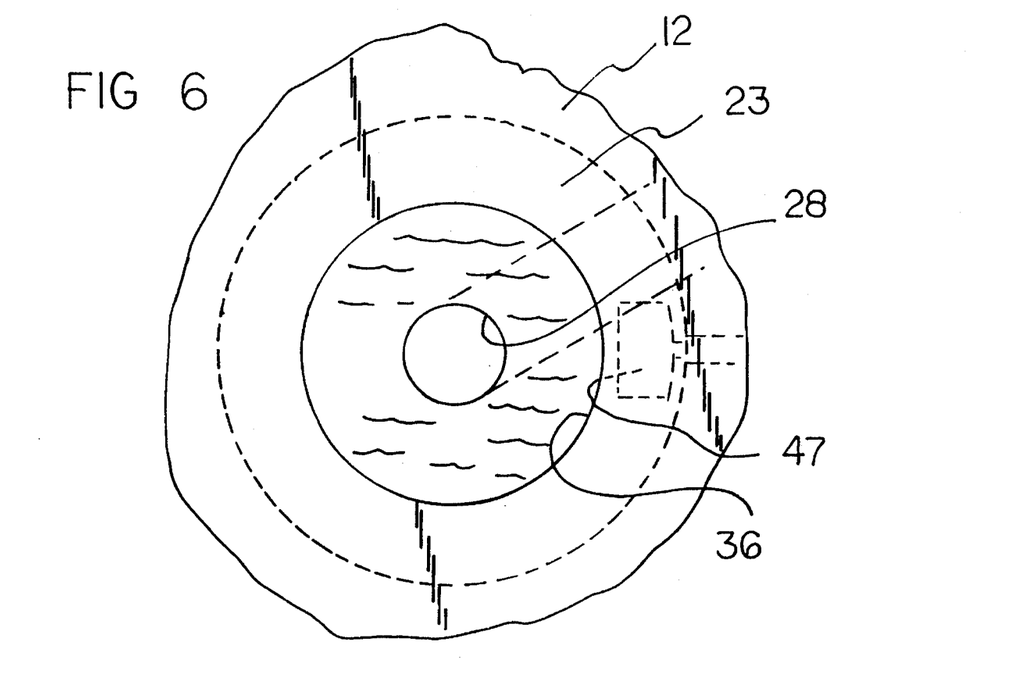
FIG. 6 is an enlarged, partial cross-sectional view of the embodiment of the invention shown in FIG. 5 taken along line 6—6 of FIG. 5.

To use the face mask assembly 25, the face mask assembly 25 is placed upon the outside adaptor portion 23 of the humidity chamber 36. The face mask assembly 25 can be rotated around a full 360 angular degrees around the outside adaptor portion 23 of the humidity chamber 36. More specifically, to use the face mask assembly 25, a person can sit upon the toilet seat 57 and face into the face mask assembly 25 with the heated, humid air entering the face mask assembly 25. The air can include scented oil as described above.

Figure 1:
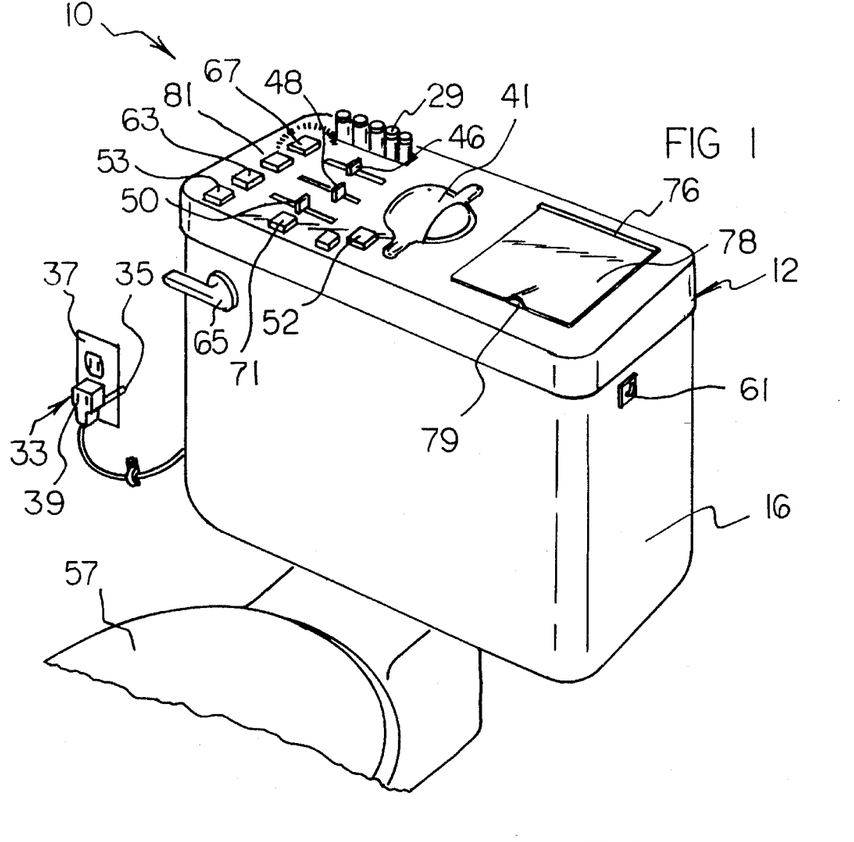
FIG. 1 is a perspective view showing a first embodiment of the portable humidifier apparatus of the invention in the form of a lid for a water closet tank which is supported by a toilet.
Figure 2:
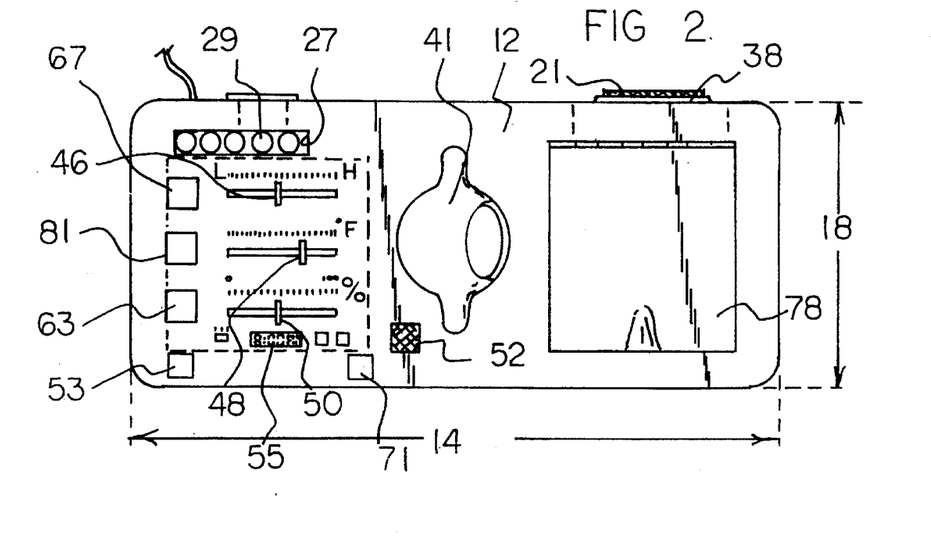
FIG. 2 is an enlarged top view of the embodiment of the portable humidifier apparatus shown in FIG. 1.
Figure 3:
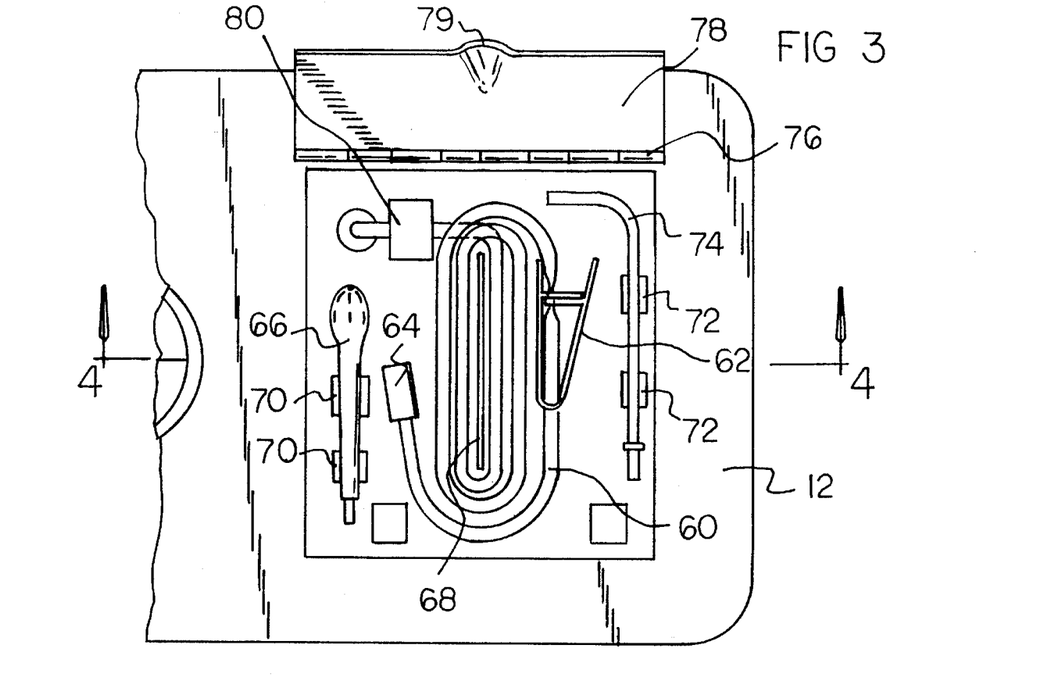
FIG. 3 is an enlarged partial top view of the embodiment of the invention shown in FIG. 2 with the lid raised for the personal hygiene portions of the invention.
Figure 4:
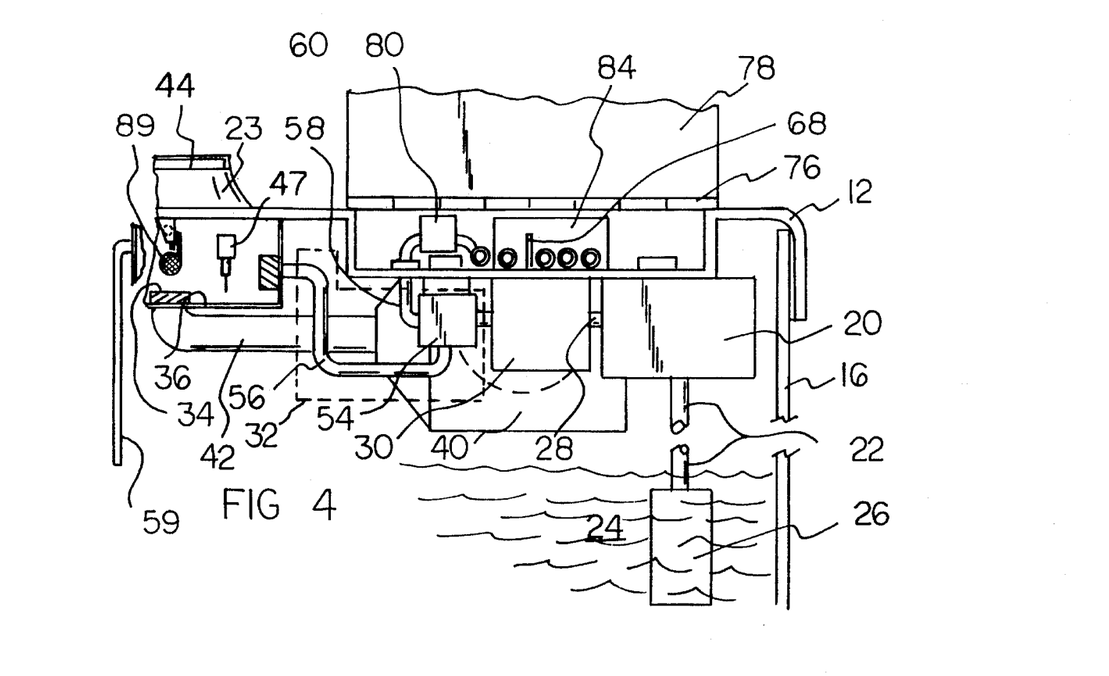
FIG. 4 is a cross-sectional view of the embodiment of the invention shown in FIG. 3 taken along line 4—4 of FIG. 3.

To operate the personal hygiene assembly, the lid assembly 78 is lifted, and the flexible tubing assembly 60 is unwound from the coiling guide 68. A nozzle 66 is removed from the first nozzle retention assembly 70 and is connected to the nozzle fixing assembly 64. The nozzle 66 is a nozzle especially adapted for carrying out a douche. Alternatively, the second nozzle 74 could be selected for attachment to the nozzle fixing assembly 64. The second nozzle 74 is for carrying out an enema. To use the personal hygiene assembly, the heated water valve assembly 54 is operated so that heated water flows through second heated water conduit 58 to the flexible tubing assembly 60. The heated water then flows through the flexible tubing assembly 60 and through the nozzle 66.

Alternatively, the selector valve assembly 54 is moved to an alternate position whereby air, rather than water, is directed through the second heated water conduit 58 to the flexible tubing assembly 60. More specifically, an electrically powered air heating assembly 45 is actuated by switch 71 to blow heated air through the second heated water conduit 58 and on through the flexible tubing assembly 60, and through the selected nozzle 66. In this mode of use, the personal hygiene assembly can be used as a blow dryer. The manual control valve 62 can also be used to control the flow of heated air through the flexible tubing assembly 60.

Figure 7:
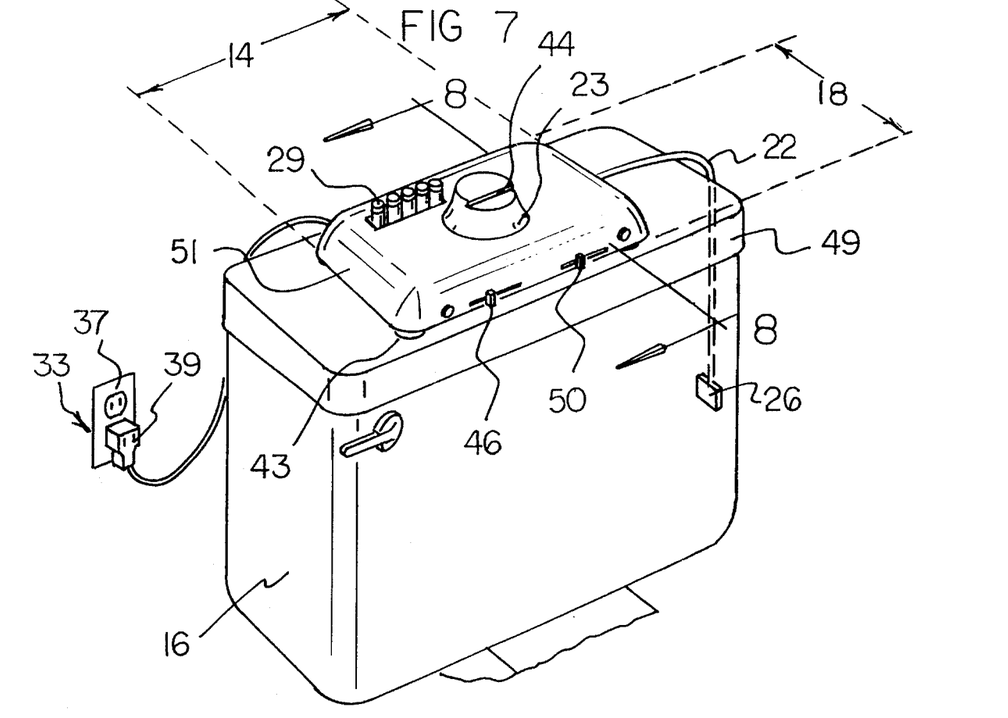
FIG. 7 is a perspective view of a second embodiment of the invention of the portable humidifier apparatus installed on top of a lid of a water closet tank.
Figure 8:
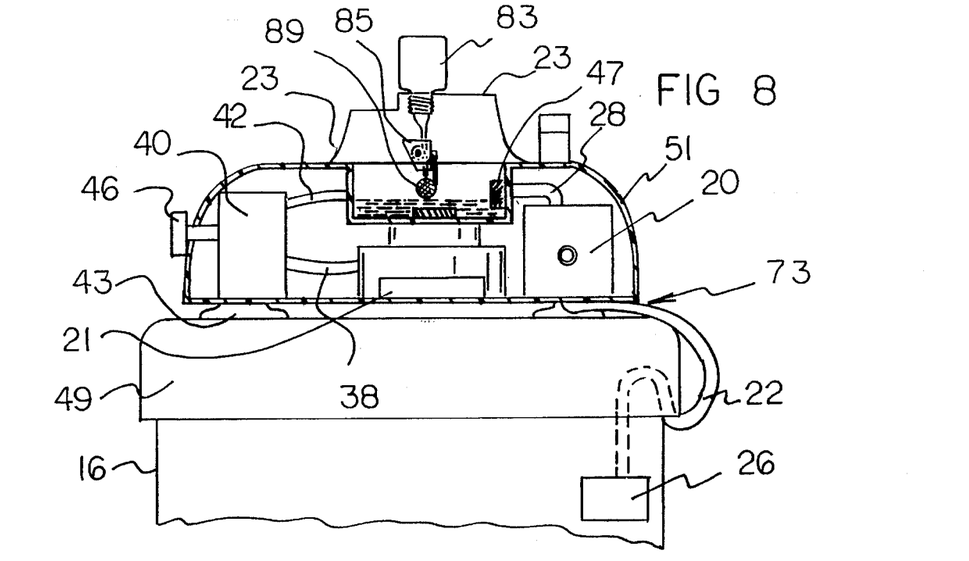
FIG. 8 is an enlarged, partial cross-sectional view of the embodiment of the invention shown in FIG. 7 taken along line 8—8 of FIG. 7.

Turning to FIGS. 7–8, a second embodiment of the invention is shown. Reference numerals are shown that correspond to like reference numerals that designate like elements shown in the other figures. In this embodiment, the base assembly 73 includes a plurality of feet 43. The feet 43 can be in the form of suction cups that adhere to the smooth surface of a typical water closet lid 49. The base assembly 73 has a base length 14 less than a length of the water closet lid 49 and has a base width 18 less than a width of the water closet lid 49, such that the base assembly 73 is adapted to fit onto the water closet lid 49. The base assembly 73 forms the base of a housing 51 which houses most of the other components of the portable humidifier apparatus 10. It is readily apparent that the second embodiment of the invention is readily portable and can be carried along during travelling. It can readily be packed in a suitcase.

The components of the portable humidifier apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved portable humidifier apparatus that is low in cost, relatively simple in design and operation, and which may advantageously be used to draw water from an automatically refillable water supply. With the invention, a portable humidifier apparatus provides an adequate supply of humidity without using a relatively large mat. With the invention, a portable humidifier apparatus is provided which fits on top of a water closet tank with a low profile. With the invention, a portable humidifier apparatus is provided which retains use of a cover for the water closet tank. With the invention, a portable humidifier apparatus provides a humidifier apparatus that is mounted on a water closet tank and that is equipped for providing a high humidity facial treatment. With the invention, a portable humidifier apparatus is provided which provision for heating the vapors used with a timer to heat a bath room in the morning when called for or for a facial treatment. With the invention, a portable humidifier apparatus is provided which controls the temperature of the vapors.

With the invention, a portable humidifier apparatus is provided which dispenses scented oils into the humidity that is dispensed. With the invention, a portable humidifier apparatus provides for using a water closet tank as a water supply for douche or enema implements that would be stored, when not in use, in the lid for the water closet tank, or with another embodiment, in a housing that is supported by a water closet tank lid. With the invention, a portable humidifier apparatus is provided which does not use a two-outlet electrical box in a manner to reduce the available outlets to only one outlet. With the invention, a portable humidifier apparatus provides a stream of warm dry air for drying off body parts that are wet.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use. It is desired that the scope of the present invention include a construction whereby the vaporizer assembly 34 is removed and replaced by a heating element mounted inside the vapor chamber 36. This would change the invention to a steam instead of a mist humidifier.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A portable humidifier apparatus for use with a water closet tank which contains a quantity of water therein, comprising:

a base assembly, an electrically powered and controlled water pump assembly attached to said base a cold water intake tube connected to said water pump assembly, wherein said cold water intake tube is extendable downward from said water pump assembly into the quantity of water contained within the water closet tank, a cold water outlet assembly connected to said water pump assembly, a humidity chamber attached to said base assembly and including an exit aperture, an electrically powered and controlled vaporizer assembly, attached to said humidity chamber, connected to said cold water outlet assembly, said vaporizer assembly producing a quantity of vapor for receipt by said humidity chamber, and an electrically powered and controlled forced air assembly attached to said base assembly and connected to said vaporizer assembly, wherein said forced air assembly includes an air intake conduit, an electrically powered fan assembly connected to said air intake conduit, an air heating assembly connected to said air intake conduit, and an air output conduit connected to said fan assembly, wherein said air output conduit is connected to said vaporizer assembly, such that a blend of output air from said fan assembly and vapor from said vaporizer assembly is mixed in said humidity chamber and emerges as mist from said humidity chamber through said exit aperture.

2. The apparatus of claim 1 wherein said cold water intake tube includes a water filter at a distal end of said cold water intake tube.

3. The apparatus of claim 1, further including:

an electrically powered and controlled water heater assembly, attached to said base assembly, in-line between said cold water outlet assembly and said vaporizer assembly, wherein said water heater assembly is connected to said cold water outlet assembly, and a heated water outlet assembly connected to said water heater assembly wherein said heated water outlet assembly is connected to said humidity chamber.

4. The apparatus of claim 3 wherein said heated water outlet assembly includes:

a selector valve assembly connected to said water heater assembly, a first heated water conduit connected between said selector valve assembly and said vaporizer assembly, and a second heated water conduit.

5. The apparatus of claim 1, further including a personal hygiene assembly, attached to said base assembly, connected to said second heated water conduit of said heated water outlet assembly.

6. The apparatus of claim 5 wherein said personal hygiene assembly includes:

a flexible tubing assembly connected to said second heated water conduit, a manual control valve connected to said flexible tubing assembly for controlling water flow through said flexible tubing assembly, a nozzle fixing assembly connected to said flexible tubing assembly, a nozzle connected to said nozzle fixing assembly, and a coiling guide, attached to said base assembly, for receiving wound tubing of said flexible tubing assembly.

7. The apparatus of claim 6 wherein said flexible tubing assembly includes a connector for connecting said flexible tubing assembly to a complementary connector on said second heated water conduit.

8. The apparatus of claim 6 wherein said personal hygiene assembly includes:

a first nozzle retention assembly attached to said base assembly, a first nozzle attached to said first nozzle retention assembly, a second nozzle retention assembly attached to said base assembly, a second nozzle attached to said second nozzle retention assembly, a third nozzle retention assembly attached to said base assembly, and a third nozzle attached to said third nozzle retention assembly.

9. The apparatus of claim 8 wherein said personal hygiene assembly includes:

a hinge assembly attached to said base assembly, and a lid assembly hingedly attached to said base assembly by means of said hinge assembly.

10. The apparatus of claim 9 wherein said personal hygiene assembly includes:

a hygiene mode selector valve assembly connected in-line between said second heated water conduit of said heated water outlet assembly and said electrically powered and controlled water heater assembly.

11. The apparatus of claim 1 wherein said base assembly has a base length greater than a length of the water closet tank and having a base width greater than a width of the water closet tank, such that said base assembly is adapted to fit over the water closet tank and serve as a lid for the water closet tank.

12. The apparatus of claim 1, further including:

a cap assembly, supported by said base assembly, for directing mist which exits from said humidity chamber when said humidity chamber.

13. The apparatus of claim 1, further including:

a replaceable air filter assembly connected to said air intake conduit of said forced air assembly.

14. The apparatus of claim 1 wherein said base assembly includes a well region for receiving a plurality of containers which contain a quantity of scented oil.

15. The apparatus of claim 1 wherein said vaporizer assembly is comprised of an electrically powered and controlled sonic vaporizer unit.

16. The apparatus of claim 15 wherein said water pump assembly, said water heater assembly, said electrically powered and controlled forced air assembly, and said vaporizer assembly are powered by a common electrical source.

17. The apparatus of claim 16 wherein said common electrical source includes an electrical adaptor assembly which includes a pair of male prongs for connecting to a wall outlet and a pair of female sockets adapted to receive a male plug.

18. The apparatus of claim 1 wherein said humidity chamber includes an outside adaptor portion.

19. The apparatus of claim 18, further including:

a face mask assembly which includes a bottom portion adapted to be received by said outside adaptor portion of said humidity chamber.

20. The apparatus of claim 19 wherein:

said outside adaptor portion of said humidity chamber is round, and said bottom portion of said face mask assembly is round and adapted to rotate around said outside adaptor portion of said humidity chamber.

21. The apparatus of claim 1, further including:

a water filter assembly connected to a distal end of said water intake tube.

22. The apparatus of claim 1, further including:

a clock which includes an on/off timer for setting a time for hot mist to be generated automatically and for generation of hot mist to cease automatically.

23. The apparatus of claim 1 wherein:

said base assembly includes a plurality of feet.

24. The apparatus of claim 1 wherein said base assembly has a base length less than a length of the water closet lid and has a base width less than a width of the water closet lid, such that said base assembly is adapted to fit onto the water closet lid.

25. The apparatus of claim 1, further including an oil dispenser assembly supported by said humidity chamber.

26. The apparatus of claim 25 wherein said oil dispenser assembly is supported by said outside adaptor portion of said humidity chamber.

27. The apparatus of claim 26 wherein said oil dispenser assembly includes:
- a bottle-mouth-reception portion,
- a bottle which includes a mouth portion adapted to be received in said bottle-mouth-reception portion,
- a flexible tube connected to said bottle-mouth-reception portion,
- a flow control assembly connected to said flexible tube, and
- an oil receptacle supported by said flow control assembly.

28. The apparatus of claim 27 wherein said flow control assembly includes:
- a roller, and
- a roller guide which receives said roller, wherein said roller guide is supported by said flexible tube when said flexible tube is clamped between said roller and said roller guide.

* * * * *